Oct. 20, 1936.  F. W. SWANSON  2,057,801
SPECTACLE CASE
Filed March 30, 1935  2 Sheets-Sheet 1
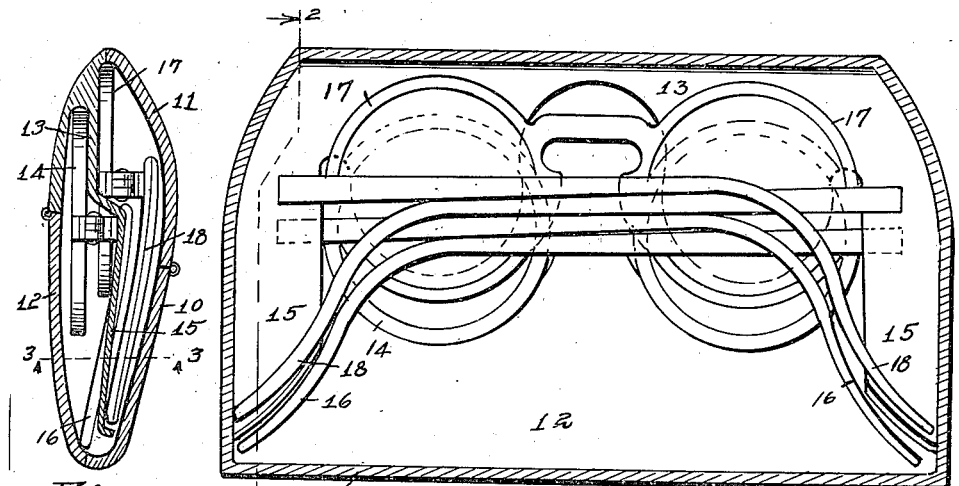
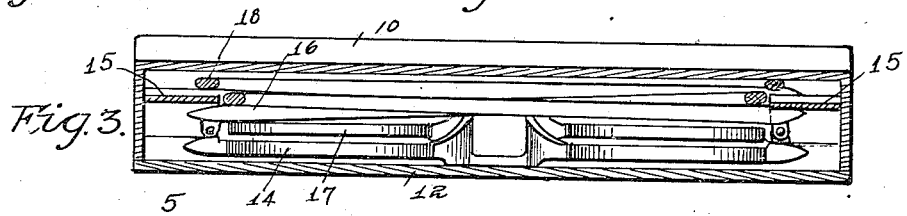
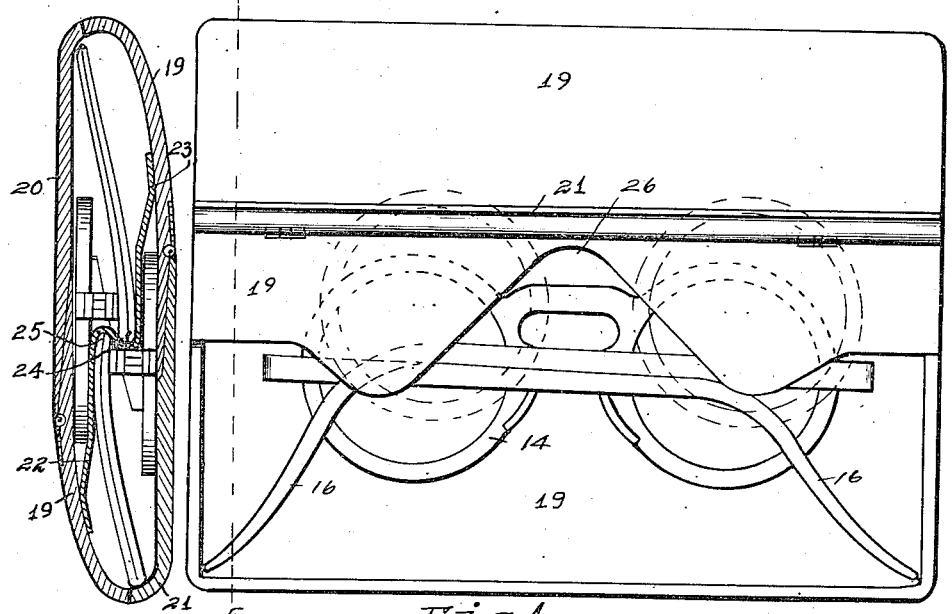

Oct. 20, 1936.  F. W. SWANSON  2,057,801
SPECTACLE CASE
Filed March 30, 1935  2 Sheets-Sheet 2
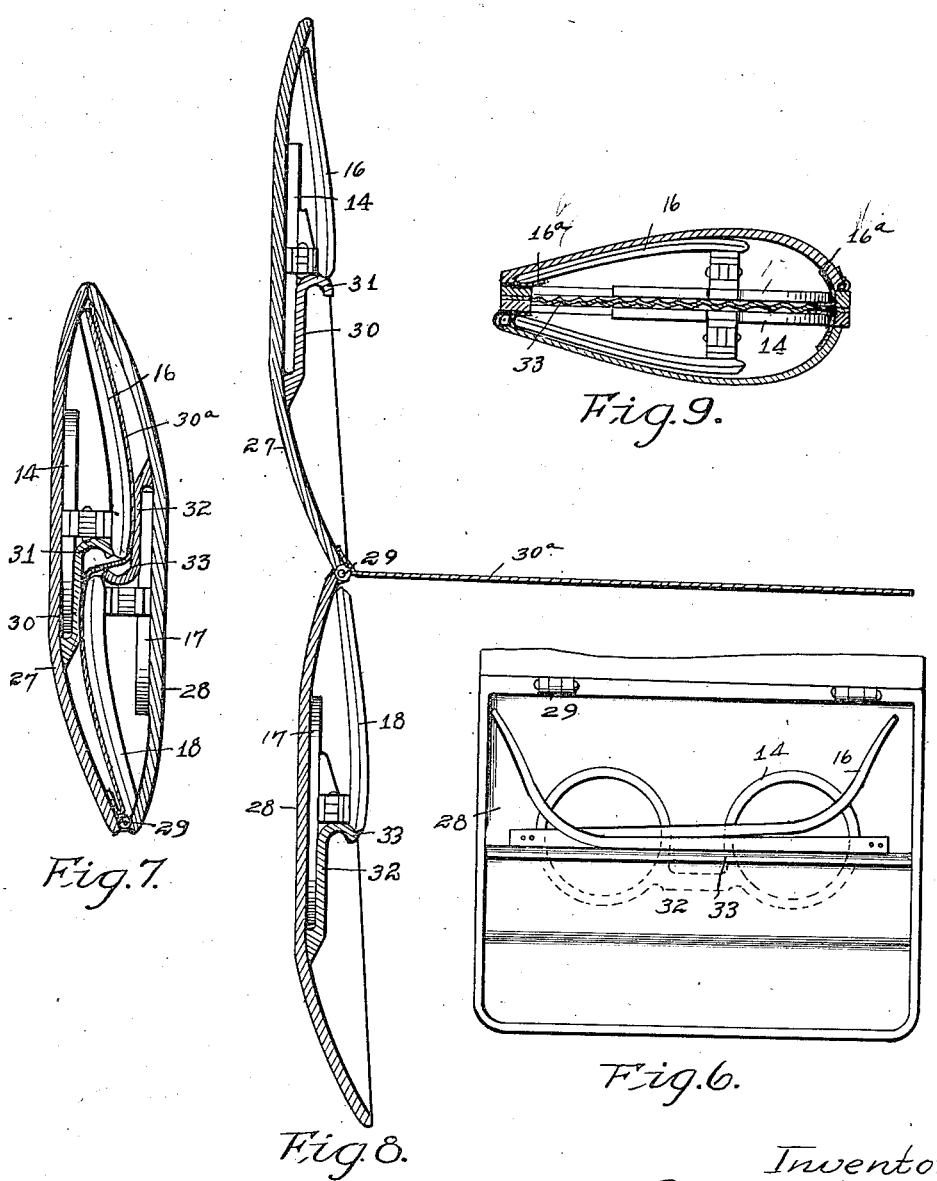

Patented Oct. 20, 1936

2,057,801

UNITED STATES PATENT OFFICE 2,057,801

SPECTACLE CASE

Fred W. Swanson, Des Moines, Iowa

Application March 30, 1935, Serial No. 13,927

5 Claims. (Cl. 206—6)

In connection with the use of spectacles, or eye glasses, it is the common practice to employ spectacle cases of somewhat rigid construction in which to carry the spectacles to prevent breakage. It is quite common for each individual to have two pair of spectacles, one for long distance and one for reading purposes, and it is, in some instances, very inconvenient for the user to carry two separate cases.

The object of my invention is to provide a spectacle case of simple, durable and inexpensive construction in which two pair of spectacles may be readily, conveniently and easily placed within and drawn from a single case, and further to provide a case of this kind in which the total outside dimensions of the case will not greatly exceed that of a case for a single pair of spectacles.

Further, it is my object to provide a suitable guide and protecting device on the interior of the case, so arranged that one pair of spectacles will be guided thereby into a certain definite predetermined position within the case and then another pair of spectacles will be guided thereby into position with the lenses partially overlapped and the lenses of one pair of spectacles inserted between the lenses and bows of another pair, so that the spectacles will occupy a minimum of space and at the same time be protected against friction with each other.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a sectional view of a spectacle case embodying my invention and having two pairs of spectacles inserted therein and held by the guide and protecting device.

Figure 2 is a transverse sectional view on the line 2—2 of Figure 1.

Figure 3 is a sectional view on the line 3—3 of Figure 2.

Figure 4 shows a plan view of another form of spectacle case embodying my invention, with two pairs of spectacles inserted therein and held in position by the guide and protecting device.

Figure 5 shows a sectional view of same on the line 5—5 of Figure 4.

Figure 6 shows a plan view of one compartment of another form of spectacle case with a pair of spectacles illustrated therein.

Figure 7 shows a sectional view of same showing both compartments in closed position and a pair of spectacles in each.

Figure 8 shows a sectional view of same with the case opened and illustrating the manner in which two pairs of spectacles may be inserted therein and guided to their proper relative positions by the guide and protecting device; and Figure 9 shows a transverse sectional view illustrating another form of spectacle case.

Referring to the accompanying drawings, I have used the reference numeral 10 to indicate generally the spectacle case, which may be of the usual rigid construction. These are commonly lined with velvet or other soft material and covered with leather. This is not illustrated. On one side of the spectacle case is a hinged member 11, which extends from one end to the other of the case, and on the opposite side is a second hinged member 12, which also extends from one end to the other of the case. These hinged members are preferably spring closed in the ordinary manner, not shown.

Supported within the interior of the case is a combined guide device and protector, which is of rigid construction and extends from one end of the case to the other and which comprises a body portion 13, spaced apart from the adjacent portion of the case, as clearly shown in Figure 2, thus forming pockets between the rigid portion of the case and the adjacent portion of the guide device into which the lens portion 14 of a pair of spectacles may be readily and easily inserted when the hinged cover member 12 is opened.

At the ends of the spectacle case this guide device and partition is extended at 15 across the interior of the case to a point opposite from the point to which the partition member is attached to the case, and these members 15 serve as guides to direct the ends of the bows.

When the spectacles containing the lenses 14 are placed in the case, the bows 16 thereof will be on one side of said guide members 15, and when the second part of spectacles is placed in the case through the opening covered by the hinged member 11, then the bows on the second pair of spectacles will be guided by the members 15 to positions on the side of the members 15 opposite from the bows of the first pair.

In Figure 2 of the drawings the lenses 17 of the second pair of spectacles are placed in position in the case partially overlapping the lenses 14 of the first pair, and the bows 18 of the second pair are also guided to position substantially parallel with the bows of the first pair.

In practical use with this form of my invention the operator first opens the hinged cover member 11 and then inserts a pair of spectacles into the casing with the bows 18 thereof on the adjacent side of the guide members 15, and the lenses of this pair of spectacles are guided to proper position in the case by the shape of the partition member 13, then the cover member 11 is closed, the case reversed in position, and the cover member 12 is opened. Then the second pair of spectacles is inserted therein with the lenses thereof entering the pockets formed between the guide and partition 13 and the adjacent side of the fixed portion of the case, and while this is being inserted, the bows of the second pair will be guided by the guide members 15 to position lying on the side of the guide members opposite from that of the bows of the first pair of spectacles. Then the hinged cover member 12 may be closed. When in this position the two pair of spectacles may be contained within a case which is not substantially larger in dimension than are the cases now usually provided for one pair of spectacles. Furthermore, the operator has ready and easy access to either pair of spectacles and they can be readily removed from the case by opening the desired one of the hinged cases and drawing the spectacles outwardly therefrom toward the adjacent edge of the case.

The lenses of one pair of spectacles cannot be injured by contact with any part of the other pair of spectacles, and the curved portions of the bows of two pairs of spectacles cannot become entangled.

In the modified form illustrated in Figures 4 and 5, I have shown a case having a flexible guide and partition device. This case comprises a rigid body portion 19, and two hinged sections 20 and 21, and a flexible guide and partition device. This flexible guide and partition device extends from one end of the case to the other, and is secured at 22 to the rigid portion of the case, and then extends upwardly, as shown in Figure 5, then toward the right, and downwardly, and then upwardly again, where it is attached at 23 to a rigid portion of the case. This forms two pocket-like structures, indicated at 24 and 25, for the reception of the lenses of two pairs of spectacles.

In this form of the invention I preferably form, at the central portion of the rigid members 19 of the case, a finger notch 26, as shown in Figure 4, for the purposes hereinafter made clear.

In practical use with this form of the invention, and in order to insert spectacles therein, I first open the cover member 20 and insert a pair of spectacles therein with the upper ends of the lenses thereof inserted at the right side of the partition 23, as shown in Figure 5, and with the upper ends of the bows inserted into the pocket shaped member 25, as shown in Figure 5, then the case is reversed and the second pair of spectacles is inserted through the opening on the other side of the case with the lenses thereof inserted between the partition 22 and the left side of the case, and the bows thereof inserted in the pocket 24.

When it is desired to remove either pair of spectacles the respective door is opened and the operator will place his fingers through the finger notch 26 and thereby grasp the connecting bar between the two lenses, as clearly shown in Figure 4, and withdraw the spectacles by moving them downwardly, as shown in Figure 5, thus sliding the pair of spectacles downwardly under the partition, as shown in Figure 4.

In Figure 4 the hinged member 21 is shown in wide open position standing straight upwardly from the case and the position of the pair of spectacles on one side of the case shown by dotted lines in position within the case and by solid lines in position partially withdrawn downwardly.

In all cases, however, a portion of this flexible partition rests between the lenses of two pairs of spectacles within the case, and thus prevents injury to the lenses and the frames.

In the form shown in Figures 6, 7 and 8 I have illustrated a spectacle case having only a single hinge, the sides of the case being indicated by the numerals 27 and 28 and the hinge by the numeral 29. Secured to the inner surface of the member 27 is a somewhat flexible partition member 30, which, as shown in Figure 7, extends upwardly and then turns to the right at 31. On the other side, 28, of the case a similar partition member 32 is fixed at its upper end to the side of the case and extends downwardly and then turns to the left at 33 in said figure.

With this form of the invention the case may be opened wide and the two pairs of spectacles inserted therein, as illustrated in Figure 8, with the lenses entering between the inner wall of the case and the adjacent surface of the guide and partition device. Then, when the spectacle case is closed, as shown in Figure 7, the guide device properly spaces the two pairs of spectacles and holds them in their proper positions within the case so that they occupy a minimum space, and at the same time, these flexible partition members serve to protect the lenses of both glasses.

In the form shown in Figure 9 I have shown a spectacle case substantially like that shown in Figures 1 and 2, and instead of the form of guide and partition device shown in Figures 1 and 2 I have provided a flexible partition 33 dividing the case centrally into two distinct compartments.

With this form of the invention either one of the hinged members may be opened and a pair of spectacles placed therein resting upon the flexible partition, and this partition will yield enough so that the projecting portions of a pair of spectacles may be pressed into the partition, which will yield enough to permit two pairs of spectacles to be placed within this case and occupy a minimum of space, and either pair may be readily and quickly inserted or removed.

In the form of the invention illustrated in Figures 7 and 8, I have disclosed a flexible partition member 30a fixed along one edge to the interior of the casing near the hinged joint and extended through the casing, as shown in Figure 7, to a point near the opposite edge of the casing. This serves as an additional protection against friction between the pairs of spectacles on opposite sides thereof.

In the form of the invention shown in Figure 9, I have provided a means for guiding each pair of spectacles to position and holding it in position within the case so that when the cover member is open, the spectacles cannot fall out of the open side. This means comprises a guide member 16a fitted against and fixed to the cover member near its hinge and extended toward the central portion of the case, and it is designed to have the lenses pass under it when being moved to position within the case, and, on the opposite side of the same compartment of the case, there is a similar guide member 16b fixed to the stationary part of the case and projected toward the central portion of the case. In use, the end portions of the curved bows of a pair of spectacles are inserted under the guide member 16b, then the ends of these yielding bows are compressed by pushing the spectacles toward the ends of the bows and against the rigid part of the case, and far enough to permit the insertion of the lenses under the guide member 16a, whereupon the spring of the bows will press the lenses under the guide member 16a and thereby hold both the lenses and the ends of the bows in proper position within the case. To remove the pairs of spectacles the operator grasps the straight portions of the bows and forces the pair of spectacles toward the guide member 16b far enough to withdraw the lenses from the guide member 16a, thus releasing the pair of spectacles.

I claim as my invention:

1. A spectacle case comprising a body one side of which is capable of moving to open position, a guide device carried by one part of the case to engage and hold a portion of the lenses of one pair of spectacles and a second guide device carried by another part of the case to engage and hold the lenses of a second pair of spectacles, said guide devices being so shaped and positioned that portions of a pair of spectacles held by the guides on each side may project into the space at the opposite side of the case, and a bow separating device within the case formed with depressions shaped to receive said projecting portions of the spectacles and to hold the bows thereof separated, the total thickness of the case being substantially less than the total thickness of the two pair of spectacles arranged in overlapping position.

2. A spectacle case comprising a body one side of which is capable of moving to open position, a guide device carried by one part of the case to engage and hold a portion of the lenses of one pair of spectacles and a second guide device carried by another part of the case to engage and hold the lenses of a second pair of spectacles, said guide devices being so shaped and positioned that portions of a pair of spectacles held by the guides on each side may project into the space at the opposite side of the case, and a bow separating device within the case formed of flexible material so that projecting portions of each pair of spectacles may project into said bow separating device and hold the bows separated, the total thickness of the case being substantially less than the total thickness of the two pair of spectacles arranged in overlapping position.

3. A spectacle case comprising a body one side of which is capable of moving to open position, a guide device carried by one part of the case to engage and hold a portion of the lenses of one pair of spectacles and a second guide device carried by another part of the case to engage and hold the lenses of a second pair of spectacles, said guide devices being so shaped and positioned that portions of a pair of spectacles held by the guides on each side may project into the space at the opposite side of the case, and a bow separating device within the case made of flexible material capable of yielding at points where portions of the spectacles project toward the other side of the case.

4. A spectacle case for two pairs of spectacles comprising a body portion, a hinged side member, a guide member at one edge of the body portion extended toward the longitudinal center of the case and shaped to receive the folded bows of a pair of spectacles, and a second guide member at the opposite edge of the case shaped to receive the edges of the lenses of a pair of spectacles, said guide members being spaced apart at such distance that the bows of a pair of spectacles must be compressed when placing the spectacles in the case, whereby the resilience of the bows will retain the bows and lenses within said guide members.

5. A spectacle case comprising a body portion, a hinged side member on each side of the body portion, a guide device carried by one part of the case to engage and hold a portion of the lenses of one pair of spectacles and a second guide device carried by another part of the case to engage and hold the lenses of a second pair of spectacles, said guide devices being so shaped and positioned that portions of a pair of spectacles held by the guides on each side may project into the space at the opposite side of the case, and a bow separating device within the case formed of flexible material so that projecting portions of each pair of spectacles may project into said bow separating device and hold the bows separated, the total thickness of the case being substantially less than the total thickness of the two pair of spectacles arranged in overlapping position.

FRED W. SWANSON.